United States Patent [19]

Koeper

[11] 4,157,467
[45] Jun. 5, 1979

[54] SEQUENTIAL CONTROL SYSTEM FOR A LIFT TRUCK

[75] Inventor: John I. Koeper, New Bremen, Ohio

[73] Assignee: Crown Controls Corporation, New Bremen, Ohio

[21] Appl. No.: 887,615

[22] Filed: Mar. 17, 1978

[51] Int. Cl.² .............................................. G06M 3/02
[52] U.S. Cl. ............................. 235/92 CT; 235/92 R; 414/632
[58] Field of Search ..................... 235/92 CT, 92 MP; 74/491; 214/674

[56] References Cited

U.S. PATENT DOCUMENTS

| | | | |
|---|---|---|---|
| 2,792,079 | 5/1957 | Gibson | 187/9 |
| 3,288,309 | 11/1966 | Fleisch | 212/128 |
| 3,319,816 | 5/1967 | Christenson | 214/673 |
| 3,393,768 | 7/1968 | Miller | 182/15 |
| 3,548,272 | 12/1970 | Messmer | 318/17 |
| 3,612,293 | 10/1971 | Ostrander | 212/21 |
| 3,791,474 | 2/1974 | Stammen et al. | 74/491 |
| 3,811,336 | 5/1974 | Pulskamp | 74/471 XY |

Primary Examiner—Joseph M. Thesz
Attorney, Agent, or Firm—Biebel, French & Nauman

[57] ABSTRACT

A control system for directing hydraulic fluid to selected cylinders on a lift truck to perform selective ones of a plurality of power truck functions, such as raising and lowering the lift forks on the truck mast, tilting the lift forks with respect to the truck mast, and extending the lift forks away from the truck mast, includes a control lever mounted on the truck control panel, having upper and lower control positions and a neutral position therebetween. A function control switch includes a manually actuatable switch button on the controlled lever. A counter means is responsive to the function control switch to cycle sequentially through a plurality of count states from an initial count state in response to actuation of the function control switch means. Means are provided responsive to the control lever and the counter means for supplying hydraulic fluid to selective ones of the cylinders under control of the control lever with selection of cylinders being determined by the count state of the counter means. The direction of flow of hydraulic fluid is determined by the position of the control lever.

11 Claims, 10 Drawing Figures

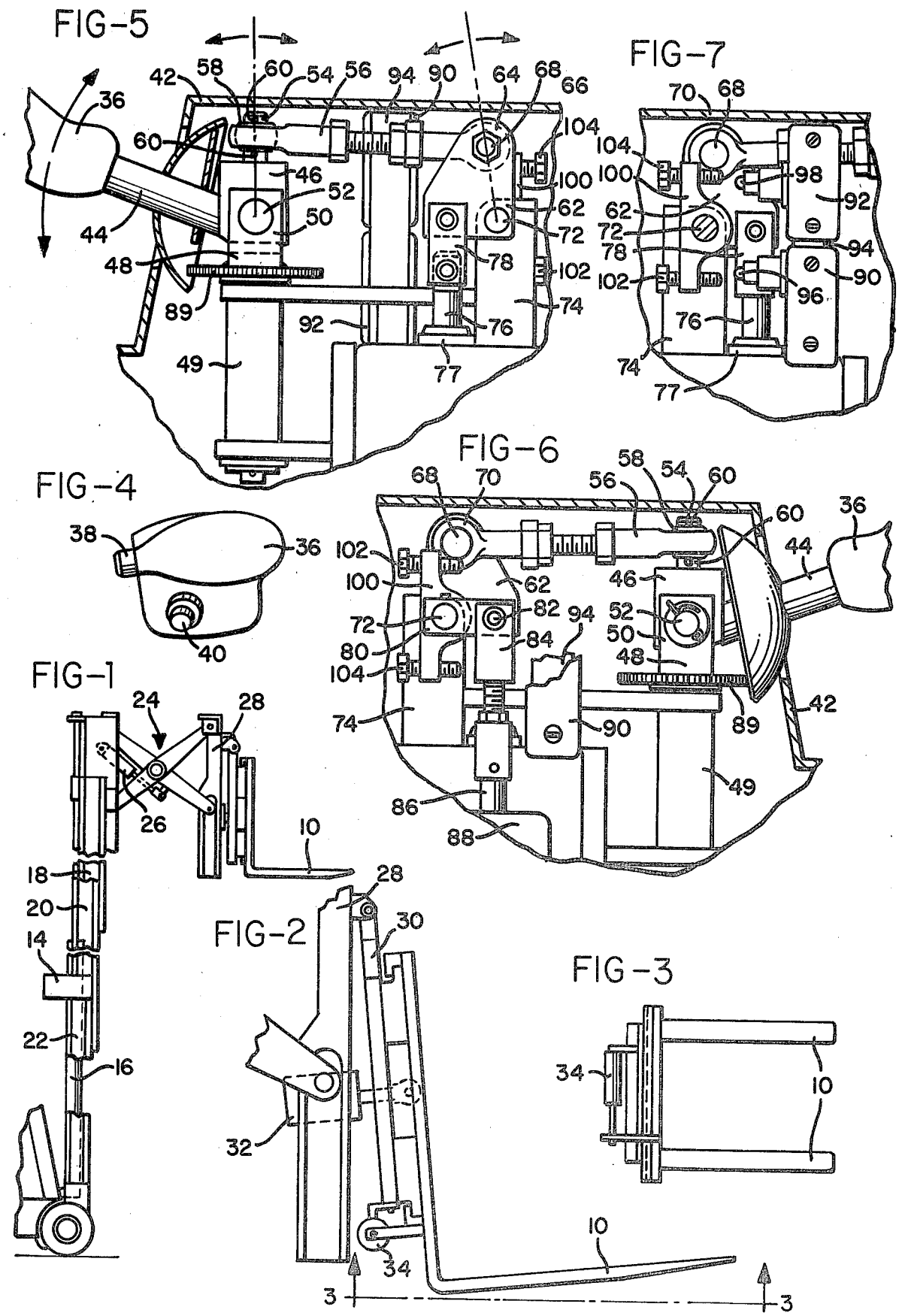

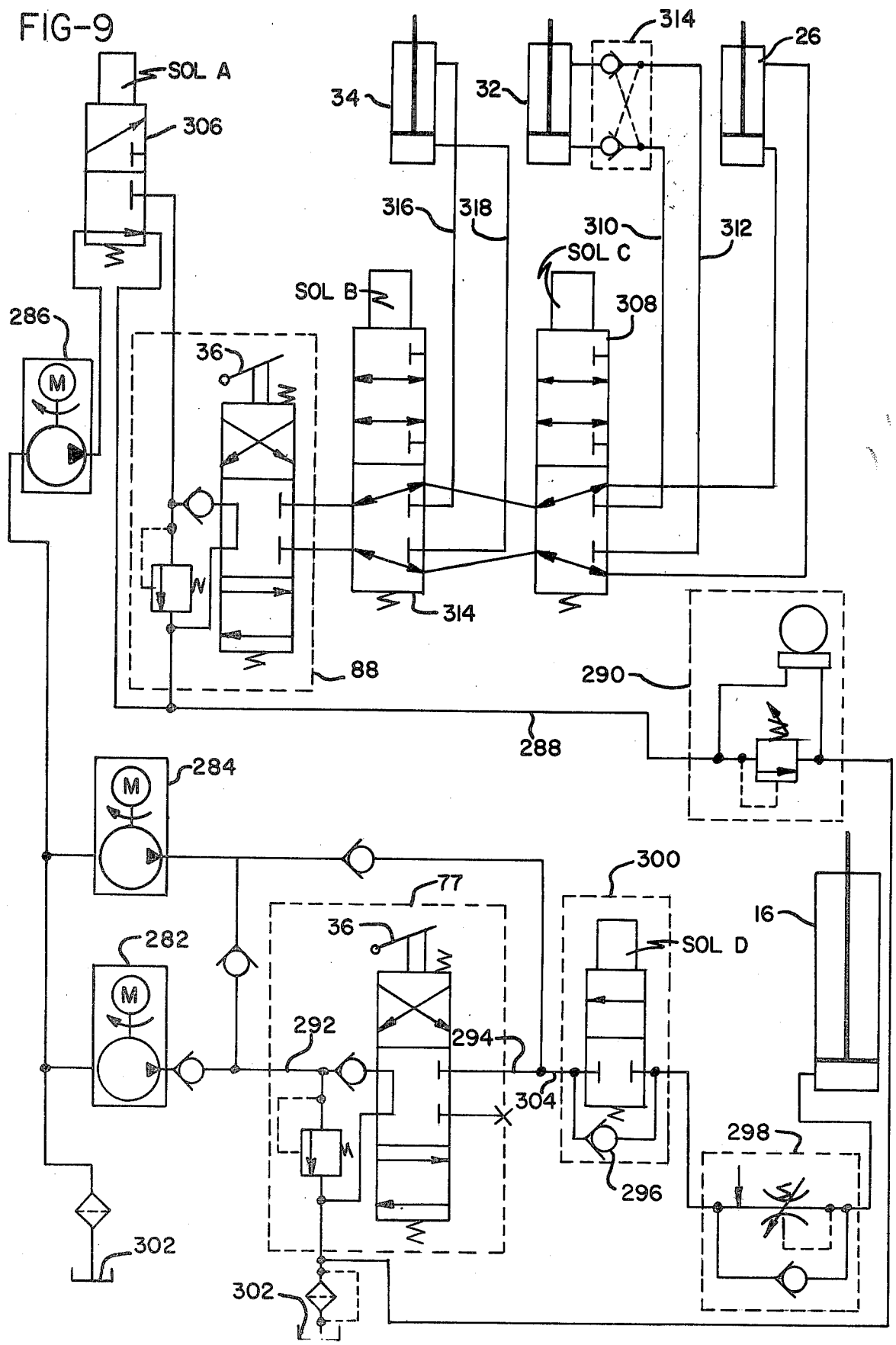

SEQUENTIAL CONTROL SYSTEM FOR A LIFT TRUCK

BACKGROUND OF THE INVENTION

The present invention relates to a control system for industrial lift trucks and, more particularly, to a control arrangement in which a plurality of power functions may be controlled with a single manual control lever.

Various power lift trucks are known which are capable of performing a number of powered functions. Typically, such trucks are used in a material handling facility, are battery powered, and may include a provision for carrying the operator. Such trucks may also provide powered means for tilting the lift forks upward or downward, for clamping the forks together or spreading them apart, for shifting the forks together sideways, for extending the forks from the mast of the truck, as well as for raising and lowering the forks on the truck mast.

Some prior art truck designs have included separate controls for steering the truck and for each of the power functions. With such a control arrangement, it is necessary for the truck operator to move his hands between controls when changing from one power function to another. This is time consuming and inconvenient and requires that the operator direct his attention away from the material handling operation momentarily. Additionally, the operator might relinquish control of either the steering or velocity controls of the truck in order to manipulate the other controls. Obviously, this is not a desirable situation.

One approach taken to solve this problem is disclosed in U.S. Pat. No. 3,811,336 issued May 21, 1974, to Pulskamp, assigned to the assignee of the present invention. In the Pulskamp device, a control lever may be moved such that it pivots about a horizontal axis or about a vertical axis. When the lever is pivoted about the vertical axis, that is when it is moved generally horizontally, the position of the lever determines the speed of the lift truck. The lever is pivoted about the horizontal axis, that is, moved vertically, to control a second function, e.g. raising and lowering the forks. A switch is positioned on the end of the control lever in the Pulskamp device. When the switch is actuated, pivoting the lever about a horizontal axis controls a third function, such as tilting of the truck forks.

The Pulskamp disclosure suggests that a second button, positioned on the control lever, may be used for controlling the truck horn, or may, alternatively, be used to select another truck function for control by the control lever. It will be appreciated that there are a limited number of buttons that can be positioned on such a lever without impairing the operation of the control, since the operator will necessarily have to take care not to actuate the wrong button.

It is seen, therefore, that there is a need for a simple control system design in which a plurality of lift truck functions are selected for control by manipulation of a manual control and which design reduces the likelihood that the wrong function will be controlled.

SUMMARY OF THE INVENTION

A control system for controlling a plurality of power functions of an industrial lift truck in a response to movement of a manually operable control, which control has a first control position, a second control position, and a neutral position intermediate said first and second control positions, includes a manually actualable function control switch means. Counter means, responsive to the function control switch means, changes its count state each time the function control switch means is actuated. A detector means is responsive to the counter means and provides detector outputs in response to the count state of the counter means. Each of the detector output states is associated with the control of a respective one of the power functions of the lift truck. A plurality of motive means are provided for performing the power functions. A power source means provides power to the motive means for performance of the power functions under control of a power control means connected to the manually operable control. Distributing means, responsive to the detector means, distributes power from the power control means to selected ones of the motive means in dependence upon the count state of the counter means, whereby any of the plurality of functions can be controlled with the manually operably control by moving the control to its first or second control positions.

The motive means may comprise hydraulic cylinders with the power source means being a source of hydraulic fluid and the power control means comprising hydraulic valves. The distributing means may comprise a plurality of solenoid actuated hydraulic valves.

The present invention may further include, advantageously, means for disabling the counter means when manually operable control is in either of the first and second control positions. Means for resetting the counter means in an initial counting state whenever the lift truck is turned on or when the manually operable control is moved into its neutral position without holding the function control switch means in an actuated position is provided to insure that the counter means assumes the count state associated with the power function which is desired to be controlled by the operator.

The manually operable control may include a control lever mounted on the control panel of the lift truck with the function control switch means including a switch button which is mounted on the end of the control lever. A plurality of lamps may be mounted on the lift truck with each of the lamps associated with a respective one of the plurality of power functions. The lamps are connected to the detector means such that each lamp will be lit when its associated functions are selected for control.

Accordingly, it is an object of the present invention to provide a control system for a lift truck in which a plurality of truck power functions are controlled by means of a single manually operable control; to provide such a control system in which a function control switch may be actuated a plurality of times, with the number of such actuations determining the function which is controlled by the manually operable control; and to provide such a control system in which the power functions are hydraulically powered.

BRIEF DESCRIPTION OF THE DRAWINGS

FIG. 1 is a partial side view of an industrial fork lift truck, illustrating the lift power function and the reach power function of the truck;

FIG. 2 is an enlarged partial view of the side of the lift truck of FIG. 1, illustrating the tilt function;

FIG. 3 is a sectional view taken generally along line 3—3 in FIG. 2, showing the side shift fork function;

FIG. 4 is an end view of the control lever for providing manual control of the truck power functions;

FIG. 5 is a partial cross sectional view of the manually operable control lever and associated mechanical linkages of the present invention; with portions removed for clarity, as incorporated in the control panel of the fork lift truck;

FIG. 6 is a partial cross sectional view of the control lever and associated linkage of the present invention with portions broken away, as seen from the opposite side with respect to FIG. 5;

FIG. 7 is a partial sectional view, similar to FIG. 6, with the electrical switch configuration added;

FIG. 8B, is a schematic representation of the electrical circuit of the present invention; and FIG. 9 is a schematic representation of the hydraulic system of the present invention.

DETAILED DESCRIPTION OF THE PREFERRED EMBODIMENTS

Figure 8A:
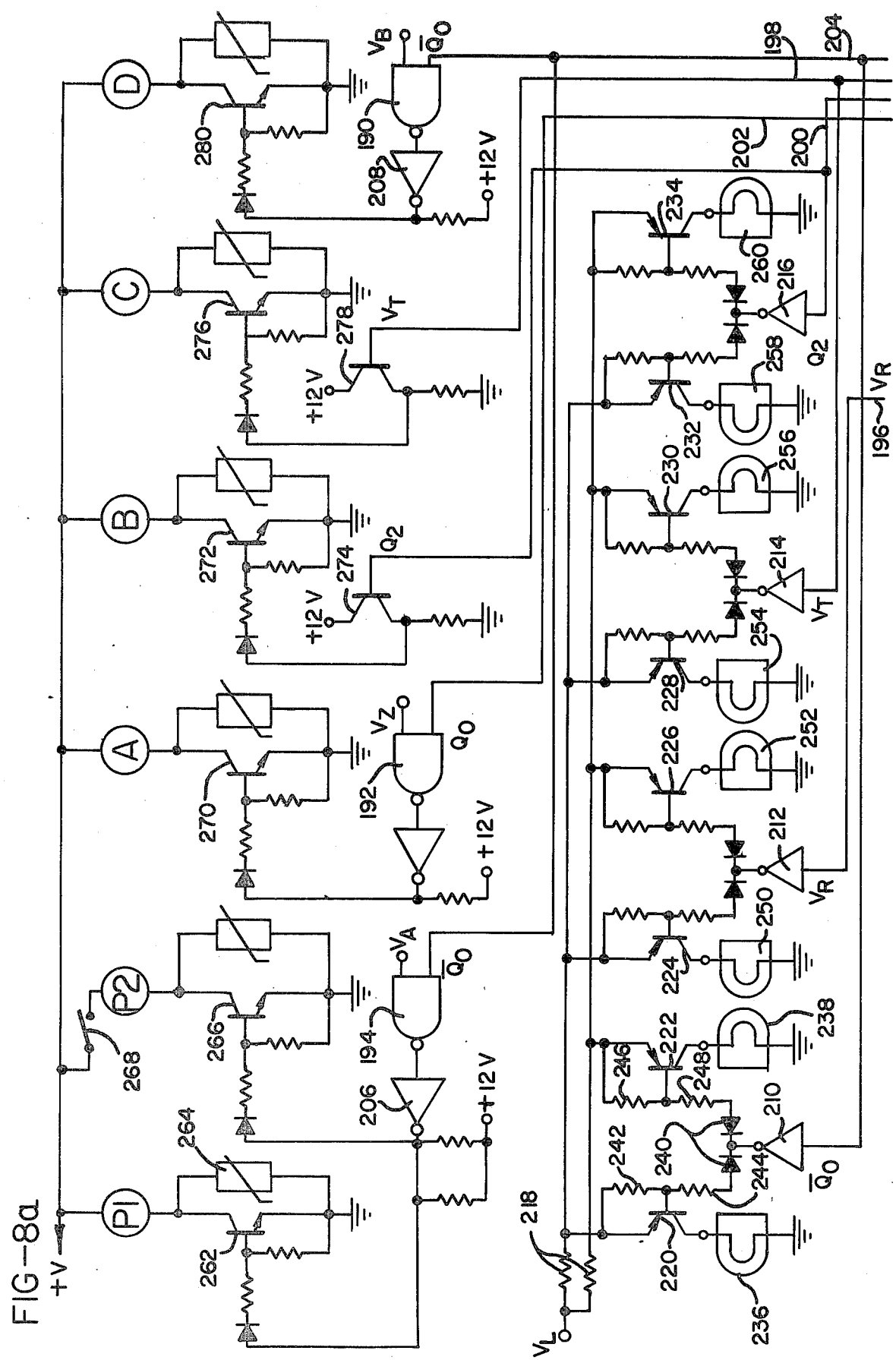
FIGS. 8A and 8B, when assembled with FIG. 8A above

Reference is now made to FIGS. 1-3 which show a lift truck of the type used in an industrial materials handling facility. The lift truck includes lift forks 10 which are mounted upon an extendable mast 14. Mast 14 is extended by means of a power motive means including hydraulic cylinder 16 which raises the upper portions 18 and 20 of the mast with respect to the lower portion 22. The details of the mechanical arrangement for such an extendable mast are well known in the truck lift art. A pantograph extension mechanism 24 includes hydraulic cylinder 26 and is connected between the upper portion of mast 14 and fork carriage 28. Hydraulic cylinder 26, when extended, moves the carriage 28 away from mast 14 and thus a power motive means for the reach function of the fork lift truck.

As seen in FIG. 2, forks 10 are attached to a plate 30 which is pivoted at its upper end to carriage 28. Hydraulic cylinder 32, having an extremely short stroke, is connected between the carriage 28 and plate 30 and provides a tilt function for tilting the forks 10 slightly upward.

FIG. 3 illustrates a side shifting function for a lift truck in which the two forks 10 may be moved sideways with respect to the truck mast. Hydraulic cylinder 34 may be connected to the forks 10 and the carriage and thus provide a power motive means for adjusting the lateral positioning of the forks. Each of the functions illustrated in FIGS. 1-3 is known in the prior art. That is, the lift/lower function, the reach function, the tilt function, and the side shift function have all previously been provided on prior art lift truck devices.

Reference is now made to FIG. 4, in which the end of a manually operable control lever for controlling a plurality of power functions on an industrial lift truck is shown.

The design of the control lever grip is the subject of U.S. Pat. No. Des. 231,741, issued June 4, 1974, to Tompkins, and assigned to the assignee of the present invention. The control lever 36 includes a pair of switch buttons 38 and 40. Button 40 controls operation of the horn of the lift truck while button 38 forms a part of the function control switch means which determines the power function of the truck to be controlled by the control lever 36 as more completely described below.

As seen in FIGS. 5-7, the control lever 36 is mounted on and extends through a control panel 42. Control lever 36 is positioned for ready access by the truck lift operator adjacent the steering control of the truck. The control lever linkage arrangement of FIGS. 5-7 is similar to that of U.S. Pat. No. 3,811,336, issued May 21, 1974, to Pulskamp, and assigned to the assignee of the present invention. As more completely described in the Pulskamp patent, the control lever 36 includes a hollow rod 44 which extends through the control panel 42 and which is connected to actuating block 46. The channel within the rod 44 serves as a conduit for the electrical wires from the switch buttons 38 and 40.

Actuating block 46 is mounted pivotally on yoke coupling shaft 48. Shaft 48 includes a pair of arms 50 between which the actuating block 46 is mounted. Arms 50 define openings through which a coupling shaft 52 extends, thereby providing for pivoting of actuating block 46 about the horizontal axis of the coupling shaft 52 in response to vertical movement of lever 36. It will be appreciated that vertical movement of lever 36 will not result in movement of the yoke coupling shaft 48 itself.

In the preferred embodiment of this invention, manual operation of the control lever 36 controls one of the plurality of power functions of the lift truck.

An actuating block coupling shaft 54 is attached to the top of actuating block 46. Arm 56 is connected onto the end of shaft 54 by a ball bearing 58 with pins 60 on either side of ball bearing 58 holding the bearing on shaft 54. When lever 36 is moved vertically, rotating block 46 about yoke coupling shaft 52, shaft 54 will be moved in conjunction therewith to push or pull arm 56 generally horizontally. A hydraultic control plate 62 is pivotally attached to arm 56 by means of pivotal connection 64. Pivotal connection 64 comprises a single piece connector, having a threaded shaft on one end and a ball joint 68 on the other end. The ball joint 68 is received in a coupling member 70 on arm 56 and connection 64 is held on plate 62 by means of a nut 68 which is threaded onto shaft 66. The details of this connective arrangement are shown more completely in the Pulskamp U.S. Pat. No. 3,811,336 cited above. The plate 62 is pivotally supported on a bearing 72 which in turn is supported by bearing support 74.

When the control lever 36 is moved vertically, causing arm 56 to move horizontally, hydraulic control plate 62 pivots about bearing 72 moves hydraulic valve spool 76 of valve 77 via linkage 78. Bearing shaft 72 extends through the bearing support 74 and, as seen in FIG. 6, has link 80 rigidly mounted at its opposite end. Link 80 is attached pivotally at 82 to hydraulic link 84 which, in turn, is connected to move the valve spool 86 of hydraulic valve 88. Thus it is seen that vertical movement of the lever 36 about shaft 52 results in actuation of hydraulic valves 77 and 88.

Horizontal movement of the control lever 36, that is, movement about its vertical axis, rotates actuating block 46 on yoke coupling shaft 48. Arm 56 will not move substantially, however, since ball bearing 58 permits shaft 54 to rotate about its principal axis relative to arm 56.

Shaft 48 is supported in a bearing 49 for rotation of a speed controller gear 90 which is attached to shaft 48. Speed controller gear 90 is operatively connected to speed control pinions, not shown, and controls the associated circuit for speed control of the lift truck as is more completely described in U.S. Pat. No. 3,811,336, issued May 21, 1974 to Pulskamp and U.S. Pat. No. 3,465,841, issued Sept. 9, 1969 to Pulskamp et al.

Reference is now made to FIG. 7, which is similar to FIG. 6, but with shaft 72 in section electrical switches 90 and 92 shown. Switches 90 and 92 are mounted on switch support 94 and include switch actuation buttons 96 and 98, respectively. A switch actuation lever 100 is attached to pivot with shaft 72 and includes switch actuation screws 102 and 104.

The position of the control lever 36, as seen in FIGS. 5 and 6, corresponds to a neutral position which is intermediate a first upper control position, in which the lever is raised, and a second lower control position, in which the lever 36 is lowered. Switch actuation screws 102 and 104 are adjusted on the actuation lever 100 such that when the control lever 36 is in its neutral position, neither of the switches 90 and 92 will be actuated. When the control lever 36 is raised, however, the shaft 72 will rotate counter clockwise, as seen in FIG. 7, with the result that screw 102 will contact actuation button 96 and switch 90 will be actuated. When the control lever is lowered, on the other hand, the shaft 72 will be rotated clockwise and screw 104 will contact switch button 98 causing switch 92 to be actuated. Thus in addition to changing the valve spool position of hydraulic valves 77 and 78, the vertical movement of the control lever 36 will result in actuation of one of switches 96 and 98. The switches only remain unactuated when the lever 36 is in the neutral position. As will be described more completely below, hydraulic valves 77 and 88 provide a power control means which controls power from a power source, such as a hydraulic pump, in dependence upon the position of the manually operable control lever 36.

Figure 8B:
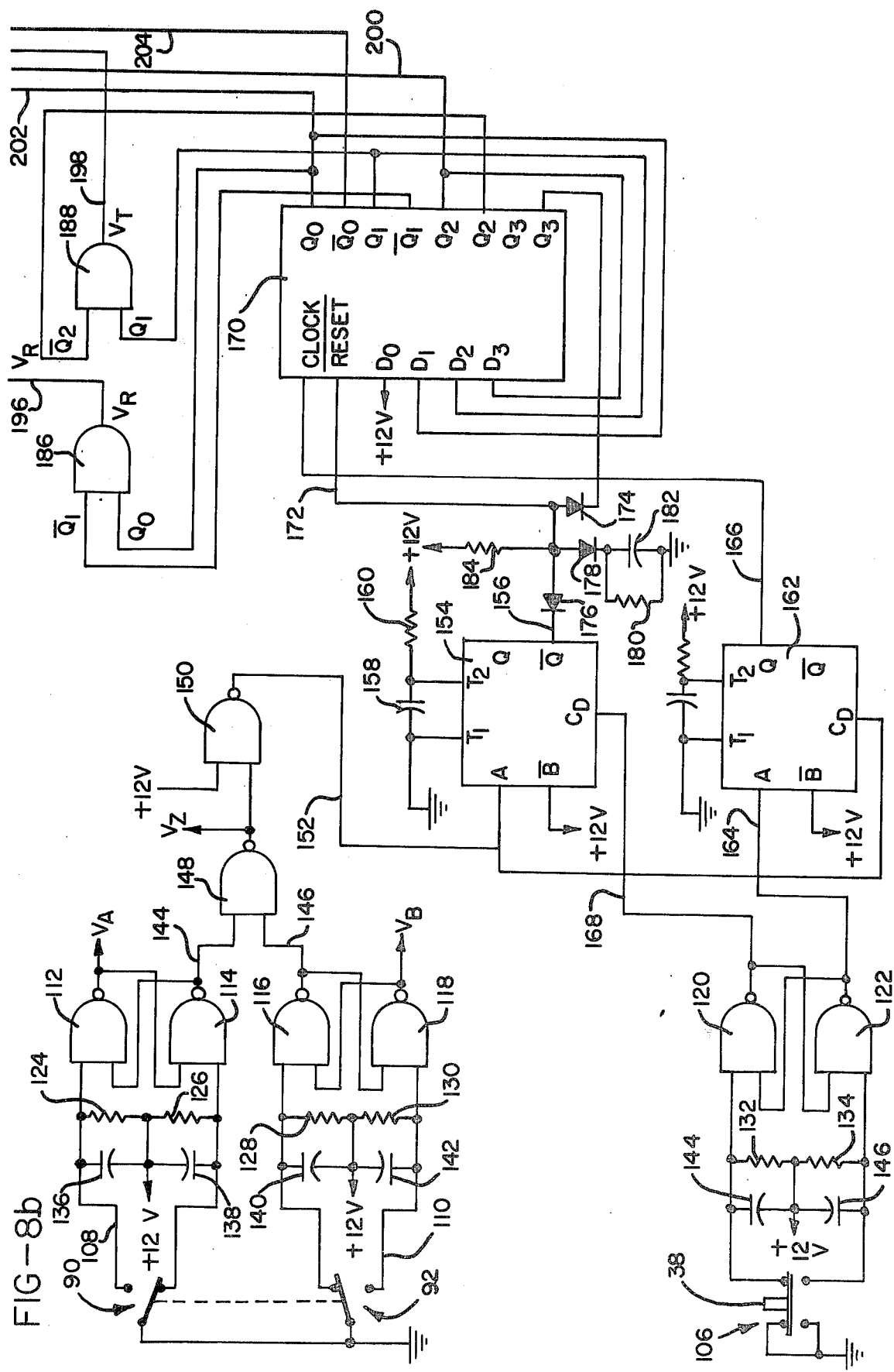

Reference is now made to FIGS. 8A and 8B which, when assembled provide a schematic representation of the control circuit of the present invention. A manually actuatable function control switch means 106 includes the manually actuatable switch button 38 on control lever 36. Also providing an input to the circuit of FIG. 8 are switches 90 and 92 which are in the position shown when the control lever 36 is in its neutral control position. When the control lever 36 is raised from its neutral position, switch 90 will be switched into its alternate switching state in which line 108 is grounded. Similarly, when control lever 36 is lowered from its neutral position, switch 92 will be actuated such that line 110 will be grounded.

In order to prevent the logic circuitry of the present invention from detecting more than one input pulse upon closure of switches 90, 92 and 106 as result of switch contact bounce, AND Gates 112, 114, 116, 118, 120, and 122, in conjunction with the resistors 124, 126, 130, 132, and 134, and capacitors 136, 138, 140, 142, 144, and 146, form R-S flip-flops on the switch inputs. The state of each of the flip-flops will be altered on initial switch closure and subsequent switch contact closures, resulting from bouncing of the switch contacts will have no effect on the control circuitry. Output $V_A$ from flip-flop 112 will be high when switch 90 is actuated, indicating that the control lever 36 has been raised by the operator. Similarly, output $V_B$ will be high when switch 92 is actuated, indicating that the operator has lowered control lever 36.

When, however, the lever 36 is in its intermediate neutral position, lines 144 and 146 will both be high, causing the output $V_z$ of NAND gate 148 to go low. When $V_z$ is low, this indicates that the control lever 36 is in its neutral position. NAND gate 150 inverts $V_z$ and provides this output to line 152. Monostable multivibrator 154 receives its trigger input from line 152 and provides a low going output pulse on line 156, which pulse is approximately 500 microseconds in duration. This period is set by capacitor 158 and resistor 160.

Similarly, monostable multivibrator 162 receives a trigger input from line 164 whenever the manually actuatable function control switch 160 is actuated by depression of the switch button 38. Multivibrator 162 will provide a positive going pulse output on line 166, however, only when its enable input $C_D$ from line 152 is high. Similarly, multivibrator 154 will be triggered only when its $C_D$ input from line 168 is high. Both multivibrators 154 and 162 will trigger on the positive going edges of pulses applied to their respective trigger inputs. By connecting the enbale inputs $C_D$ of multivibrators 154 and 162 as shown, multivibrator 154 will only provide a trigger pulse on output 156 as the control lever 36 moves from one of its control positions into its neutral position with the manually actuatable function control switch 38 not being depressed. Similarly, multivibrator 162 can only supply a positive going pulse to output 166 when the control lever 36 is in its neutral position.

A four section type D flip-flop 170 receives clock input pulses from line 166. Its reset input is connected to a line 172 and will reset when line 172 goes low. The four data inputs, $D_0$, $D_1$, $D_2$, and $D_3$, of flip-flop 170 are connected to a +12 volt DC supply, $Q_0$, $Q_1$, and $Q_2$, respectively, such that the output state of the four section flip-flop 170 will be as follows upon sequential receipt of pulses on line 166.

| Number of Pulses Received | OUTPUTS OF 170 | | | | | | | |
|---|---|---|---|---|---|---|---|---|
| | $Q_0$ | $Q_1$ | $Q_2$ | $Q_3$ | $\overline{Q_0}$ | $\overline{Q_1}$ | $\overline{Q_2}$ | $\overline{Q_3}$ |
| None | 0 | 0 | 0 | 0 | 1 | 1 | 1 | 1 |
| 1 | 1 | 0 | 0 | 0 | 0 | 1 | 1 | 1 |
| 2 | 1 | 1 | 0 | 0 | 0 | 0 | 1 | 1 |
| 3 | 1 | 1 | 1 | 0 | 0 | 0 | 0 | 1 |

Thus it can be seen that the four section flip-flop 170 is connected to form a counter means which is responsive to the function control switch means 106 for changing its count state each time the function control switch means is actuated. It should be noted that the $\overline{reset}$ input of counter 170 receives an input from its $\overline{Q_3}$ output via diode 174 such that the fourth pulse received on line 166 will reset the counter means to its initial count state. Since the monostable multivibrator 162 will pass pulses from NAND gate 122 to the counter means 170 only when its $C_D$ input is high, it is apparent that the multivibrator 162 acts as a means of disabling the counter means 170 when the manually operable control is in either of its first or second control positions.

Further, the monostable multivibrator 154 acts as a means for resetting the counter means 170 via diode 176 whenever the manually operable control 36 is moved into its neutral position without the function control switch means 160 being held in an actuated position. It is desirable, as well, that the counter 170 be reset when the truck is initially turned on and that the initial count state of the counter 170 be provided at its output at this time. To accomplish this, the diode 178, resistor 180, and capacitor 182 are connected between ground and line 172. Capacitor 182 will hold line 172 at ground as the power is turned on until the capacitor 182 can charge through series resistor 184. Resistor 180 is provided to bleed capacitor 182 of its charge when the truck is turned off.

A detector means, including AND gates 186, 188, NAND gates 190, 192, and 194, is responsive to the counter means 170 for providing a detector output in response to the count state of the counter means 173. Each of the detector output states is associated with the control of a respective one of the power functions which are to be selected for control by the circuit. Thus, AND gate 186 will provide a high output on a line 196 when the reach function is to be controlled. Similarly, AND gate 188 will provide an output on line 198 when the tilt function is to be controlled. A high output from the $Q_2$ output of counter 170 on line 200 indicates that the side shift function is to be controlled. A high output on line 202 from the $Q_0$ output of counter means 170 indicates that one of the functions, other than the lift and lower function, is to be controlled. Finally a high output on a line 204 from the $\overline{Q_0}$ of counter 170 indicates that the lift and lower function is to be controlled. NAND gate 194 and inverter 206 provide an output when the lift and lower function is controlled and the manually operable control lever 36 is moved into a control position indicating that the forks should be raised. Similarly, the NAND gate 190 and inverter 208 provide an output when the lift and lower function is being controlled, and the forks are to be lowered.

Inverters 210, 212, 214, and 216, switch on pairs of lamps which are associated with respective power functions as those functions selected for control. Power for the lamps is provided through resistors 218 under control of transistors 220, 222, 224, 226, 228, 230, 232, and 234.

Lamps 236 and 238 will be energized when the input to inverter 210 goes high. This will occur when the lift and lower function is selected for control. At this time, the output of inverter 210 will go low, and the diodes 240 will become forward biased, switching on the transistors 220 and 222 through resistors 242, 244, 246, and 248. In similar fashion lamps 250 and 252, will be energized when the reach function is selected for control; lamps 254 and 256 will be energized when the tilt function is selected for control; and lamps 258 and 260 will be energized when the side shift function is selected for control. One set of the lamps may be mounted on the control panel to provide the operator with a visual indication of the function then selected for control. The second set of lamps may be mounted at another location on the fork lift truck, such as on the mast to provide a visual indication of the function which may be seen even though the operator is observing the material handled by the truck.

As will be described below in conjunction with the description of the hydraulic control of the present invention, solenoids A, B, C and D actuate valves in the hydraulic system and form a part of a distributing means for distributing power from the power source to the motive means in dependence upon the count state of the count means. Additionally, relay coils $P_1$ and $P_2$ provide for energization of electric motors which are operatively connected to primary and secondary hydraulic pumps, respectively. When the output of inverter 206 goes high, indicating that the raise and lower function is being controlled, and further, that it is desired to raise the forks, transistor 262 will be switched on, thus energizing solenoid coil $P_1$. This will, in turn, close an electrical switch and provide power to an electric motor which is connected to the primary pump. A varistor 264 is connected in parallel with the transistor 262 to prevent damage to the transistor 262 from voltage transients generated by the collapsing field of coil $P_1$ as it is turned off.

Transistor 266 will be switched on simultaneously with transistor 262 if a limit switch 268 is closed. Switch 268 is mounted adjacent control lever 36 and is closed when the control lever 36 is raised to its maximum position. As will be seen below, the energization of coil $P_2$ will connect power to an electric motor connected to power an auxiliary hydraulic pump.

An accessory solenoid A is actuated when both $V_Z$ and $Q_0$ are high as a result of transistor 270 being switched on. This condition occurs only when the control lever 36 is not in its neutral position and, simultaneously, a function other than the lift and lower function is being controlled.

Solenoid B will be energized when transistor 272 is switched on indicating that the side shift function is being controlled. This, in turn, will occur when transistor 274 is turned on when the $Q_2$ output of counter means 170 goes high.

Solenoid C will be energized as a result of transistors 276 and 278 being turned on; this occurs as a result of the output 198 from AND gate 188 going high, indicating that the tilt function is to be performed. Finally, NAND gate 190 and inverter 208 will switch transistor 280 on when the lift and lower power function is being controlled, and it is desired to lower the forks.

Reference is now made to FIG. 9 which illustrates schematically the hydraulic arrangement of the present invention. Valves 77 and 88 are shown diagramatically as connected to a manually operable control, the control lever 36. When the lever 36 is raised, the valves 88 and 77 will be moved upwardly. Conversely, when the control lever 36 is lowered, the valves 77 and 88 will be moved into their lower valve position. A primary pump and motor arrangement 282 will operate when the solenoid $P_1$ is energized. Similarly, auxiliary motor and pump 284 will operate when the $P_2$ solenoid is energized. A power steering and accessory motor pump combination 286 is provided and this operates continuously as long as the truck is switched on, providing pressure through line 288 to power steering torque generator 290.

When it is desired to raise the forks, lever 36 is raised and the solenoid coil $P_1$ energized, causing pump 282 to begin pumping. Simultaneously, the valve 77 will be actuated into its upper position in which hydraulic fluid from line 292 is provided to line 294. This fluid passes through check valve 296 and flow limiting valve 298, with the result that the piston of cylinder 16 will be raised by a fluid. When the forks have been raised sufficiently, the control lever 36 will be moved into its neutral position and the valve 77 will assume the middle valve position, as shown in FIG. 9. At this time, movement of the cylinder piston 16 will stop and the forks will be held in the position attained.

When it is desired to lower the forks, the valve 77 will be lowered into its lower valve position, and simultaneously, solenoid D will be energized, thus actuating valve 300. A return of path for fluid from the cylinder 16 to the fluid reservoir 302 will therefore be provided.

If the control lever 36 should be raised to its extreme upper position, the auxiliary pump 284 will operate along with pump 282, adding to the flow of fluid through line 304.

If it is desired to extend the forks in the reach function, the solenoid A is energized, moving valve 306 into its lower valve position. Hydraulic fluid is, therefore, applied to the hydraulic cylinder 26. The direction of movement of the cylinder piston is dependent upon whether the valve 88 is moved into its upper or lower valve position.

When it is desired to tilt the lift truck forks, hydraulic cylinder 32 receives hydraulic fluid as a result of valve 308 being actuated into its lower valve position by solenoid C. Solenoid A will simultaneously actuate valve 306 into its lower position. Hydraulic fluid will, therefore, be provided under pressure to lines 310 and 312 in dependence upon the valve position of valve 88. A check valve arrangement 314 is provided in lines 310 and 312 to insure that the position of the cylinder piston is maintained, once being positioned as desired.

Finally, the side shaft function will be controlled when solenoid B actuates the hydraulic valve 314 into its lower valve position and valve 306 is actuated by solenoid A. The valve 88 will, therefore, determine the application of fluid to lines 316 and 318. Thus it is seen that the power source means for providing power for performance of the power functions by the plurality of motive means is a plurality of hydraulic pumps which are powered by electric motors. Power control means, connected to the manually operable control, for providing power from the power source means in dependence upon the position of the manually operable control includes the valves 88 and 77. Solenoid actuated valves 300, 306, 308, and 314 provide a distributing means which is responsive to the detector means for distributing power from the power control means to the motive in dependence upon the count state of the counter means 170.

While the form of apparatus herein described constitutes a preferred embodiment of the invention, it is to be understood that the invention is not limited to this precise form of apparatus, and that changes may be made therein without departing from the scope of the invention.

What is claimed is:

1. A control system for controlling a plurality of power functions of an industrial lift truck in response to movement of a manually operable control, said control having a first control position, a second control position, and a neutral position intermediate said first and second control positions, comprising:
   manually actuatable function control switch means,
   counter means, responsive to said function control switch means, for changing its count state each time said function control switch means is actuated,
   detector means, responsive to said counter means, for providing detector outputs in response to the count state of said counter means, each of the detector output states being associated with the control of a respective one of said power functions,
   a plurality of motive means for performing said plurality of power functions,
   power source means for providing power for performance of said power functions by said plurality of motive means,
   power control means, connected to said manually operable control, for providing power from said power source means in dependence upon the position of said manually operable control, and
   distributing means, responsive to said detector means, for distributing power from said power control means to said motive means in dependence upon the count state of said counter means, whereby any of said plurality of power functions may be controlled with said manually operable control by moving said control into its said first and second control positions.

2. The control system of claim 1 in which said plurality of motive means comprise hydraulic cylinders, said power source means comprises a source of hydraulic fluid, said power control means comprises a hydraulic valve and said distributing means comprise a plurality of solenoid actuated hydraulic valves.

3. The control system of claim 1 further comprising means for disabling said counter means when said manually operable control is in either of said first and second control positions.

4. The control system of claim 1 or 3 further comprising means for resetting counter means to an initial counting state whenever said lift truck is turned on or whenever said manually operable control is moved into said neutral position without holding said function control switch means in an actuated position.

5. The control system of claim 1 in which said manually operable control includes a control lever mounted on the control panel of a lift truck and in which said function control switch means includes a switch button mounted on the end of said control lever.

6. The control system of claim 5 further comprising a plurality of lamps mounted on said lift truck, each of said lamps associated with a respective one of said plurality of power functions and connected to said detector means such that each lamp will be lit when its associated function is selected for control.

7. A control system for directing hydraulic fluid to selected cylinders on a lift truck to perform selected ones of a plurality of power truck functions, comprising,
   a control lever, mounted on the truck control panel, having upper and lower control positions and a neutral position therebetween,
   a function control switch means having a manually actuatable button on said control lever,
   counter means, responsive to said function control switch means, for cycling sequentially through a plurality of count states from an initial count state in response to actuation of said function control switch means,
   means, responsive to said control lever and said counter means, for supplying hydraulic fluid to selected ones of said cylinders under control of said control lever with the selection of cylinders being determined by the count state of said counter means and the direction of flow of hydraulic fluid being determined by the position of said control lever.

8. The control system of claim 7 further comprising means for disabling said counter means from changing its count states when said control lever is in its upper or lower control positions.

9. The control system of claim 8 further comprising means for resetting said counter means to said initial count state when said control lever is moved into its neutral position from either of said upper or lower control positions without said switch button being actuated.

10. The control system of claim 8 further comprising means for resetting said counter means to said initial count state whenever said lift truck is turned on.

11. The control system of claim 7 further comprising indicator means mounted on said lift truck and responsive to said counter means, for providing an indication to the lift truck operator of the truck function being controlled.

* * * * *